INVENTORS,
Emory L. Dell, Jr.,
and Thomas M. Strickland,
BY Frank S. Appleman,
Attorney

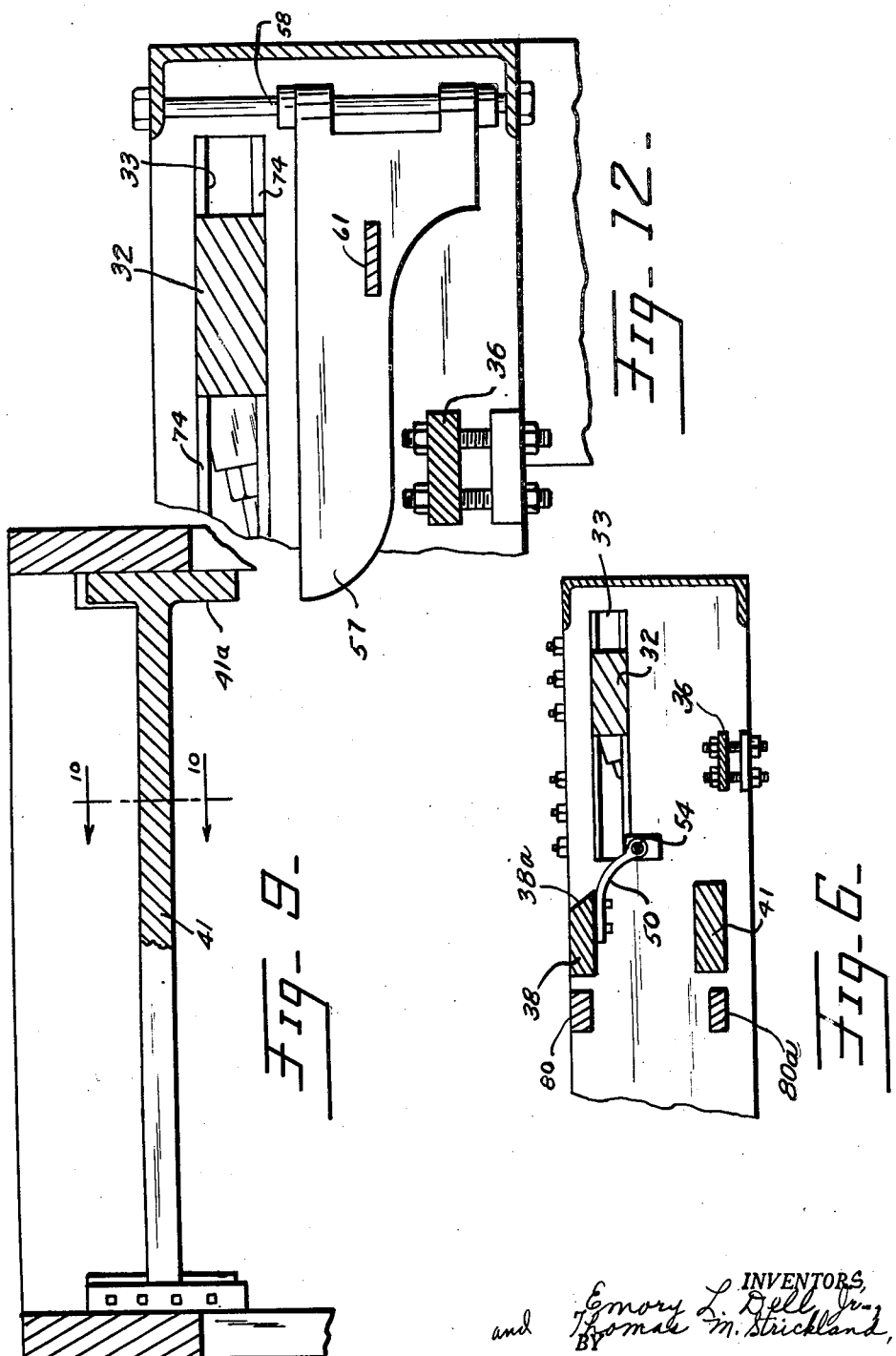

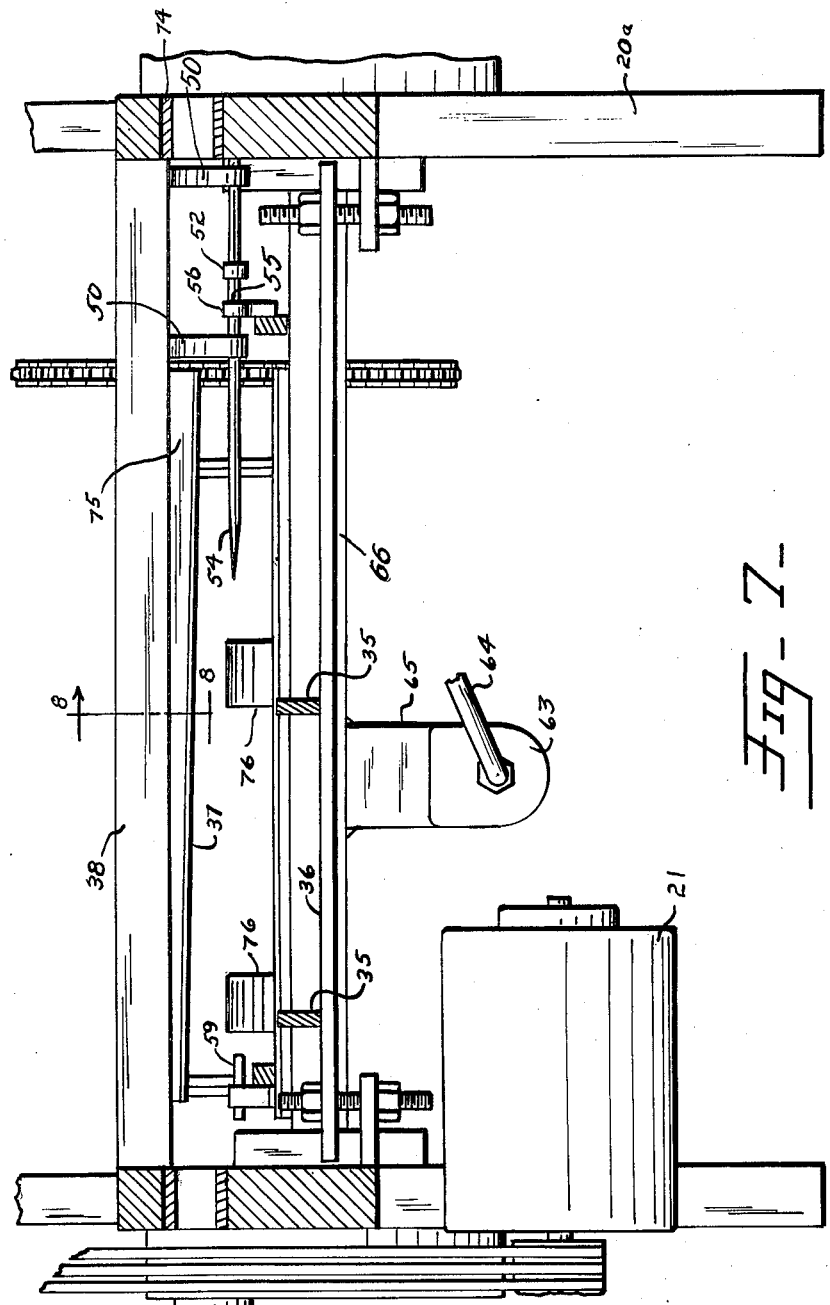

April 14, 1953 E. L. DELL, JR., ET AL 2,634,772
VENEER SIZING MECHANISM
Filed Jan. 17, 1947 11 Sheets-Sheet 7
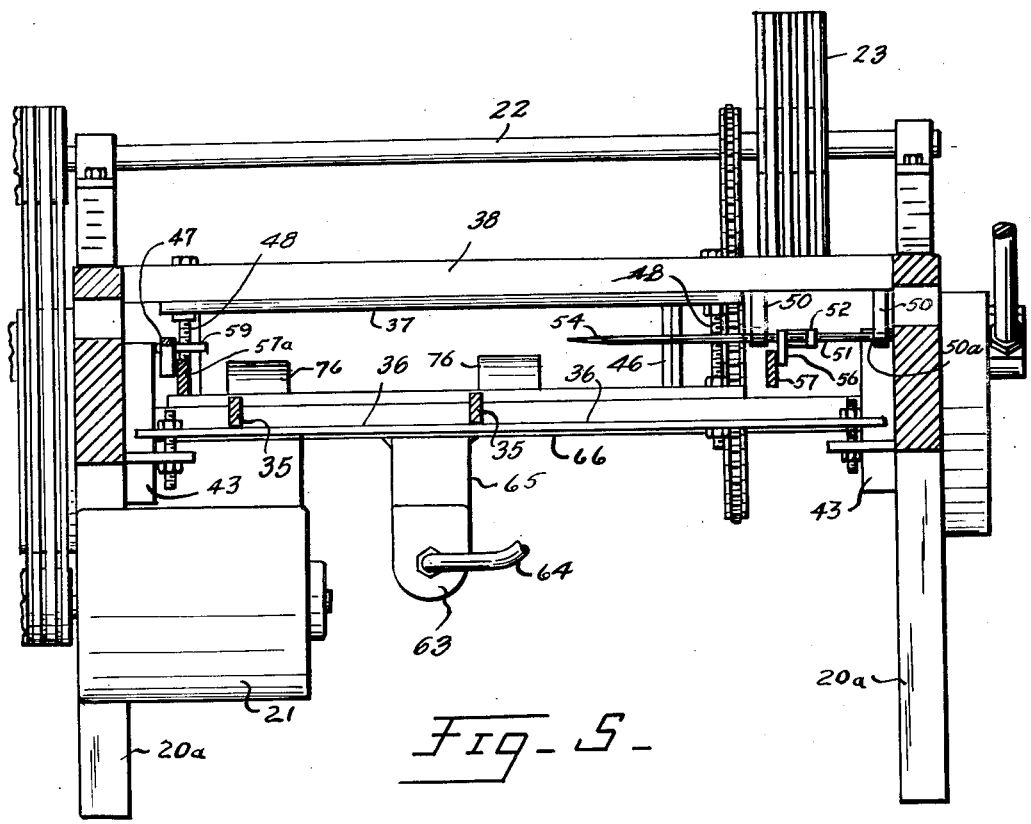
Fig-5-
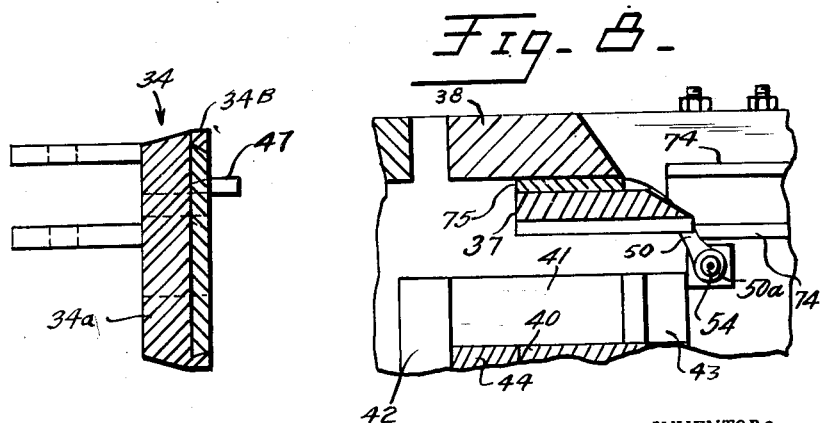
Fig-17- Fig-8-
INVENTORS,
Emory L. Dell, Jr.,
and Thomas M. Strickland,
BY
Frank S. Appleman,
attorney April 14, 1953  E. L. DELL, JR., ET AL  2,634,772
VENEER SIZING MECHANISM
Filed Jan. 17, 1947  11 Sheets-Sheet 8
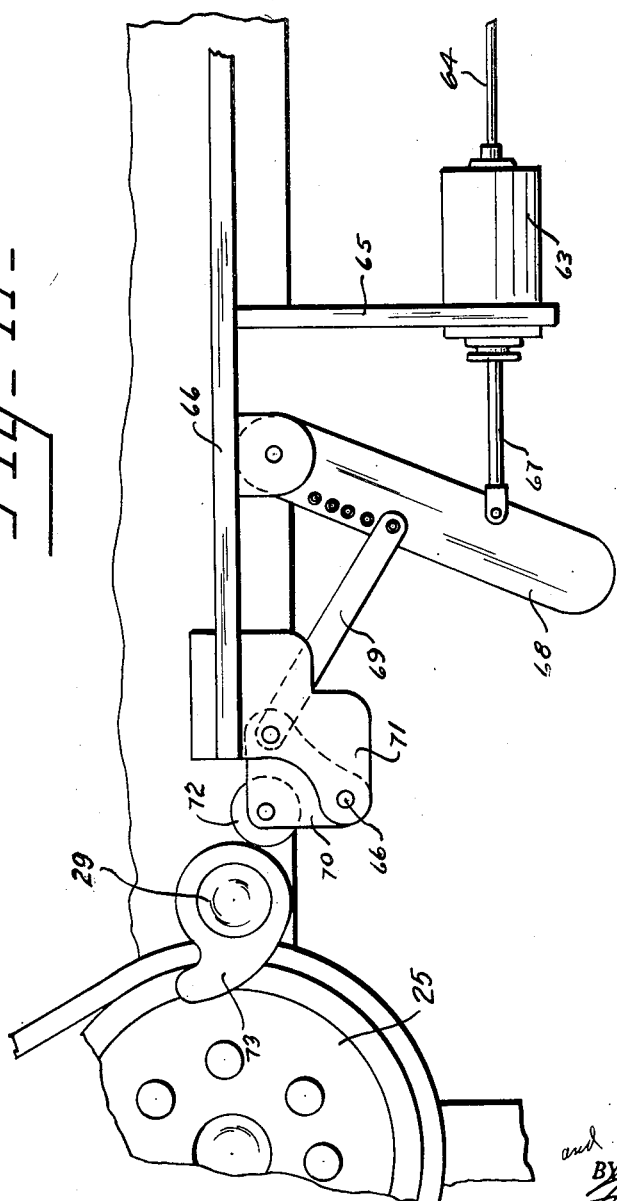
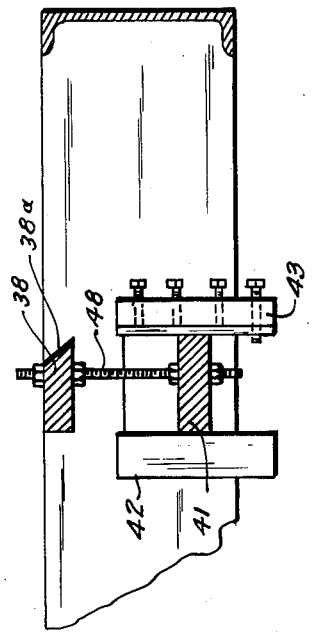

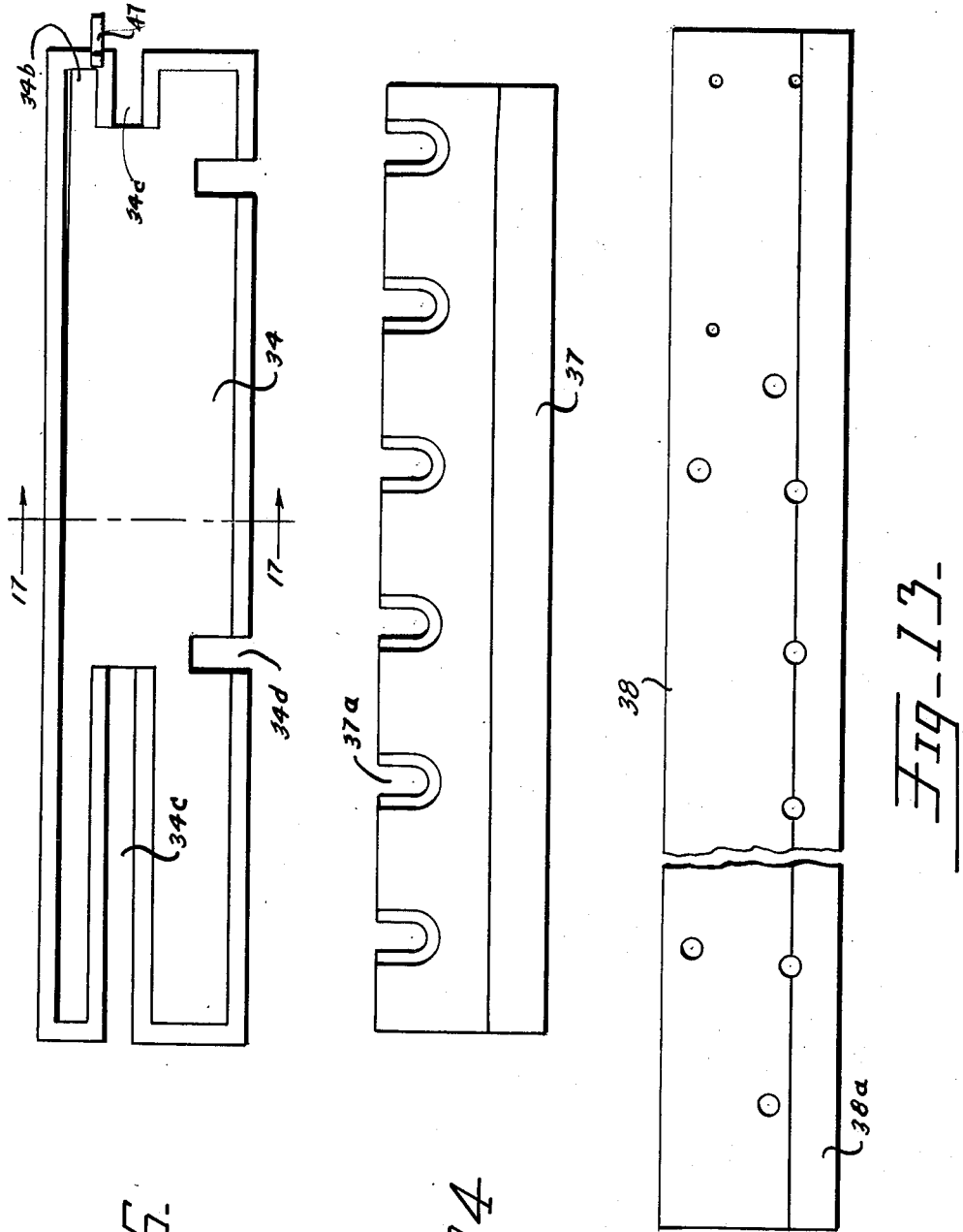

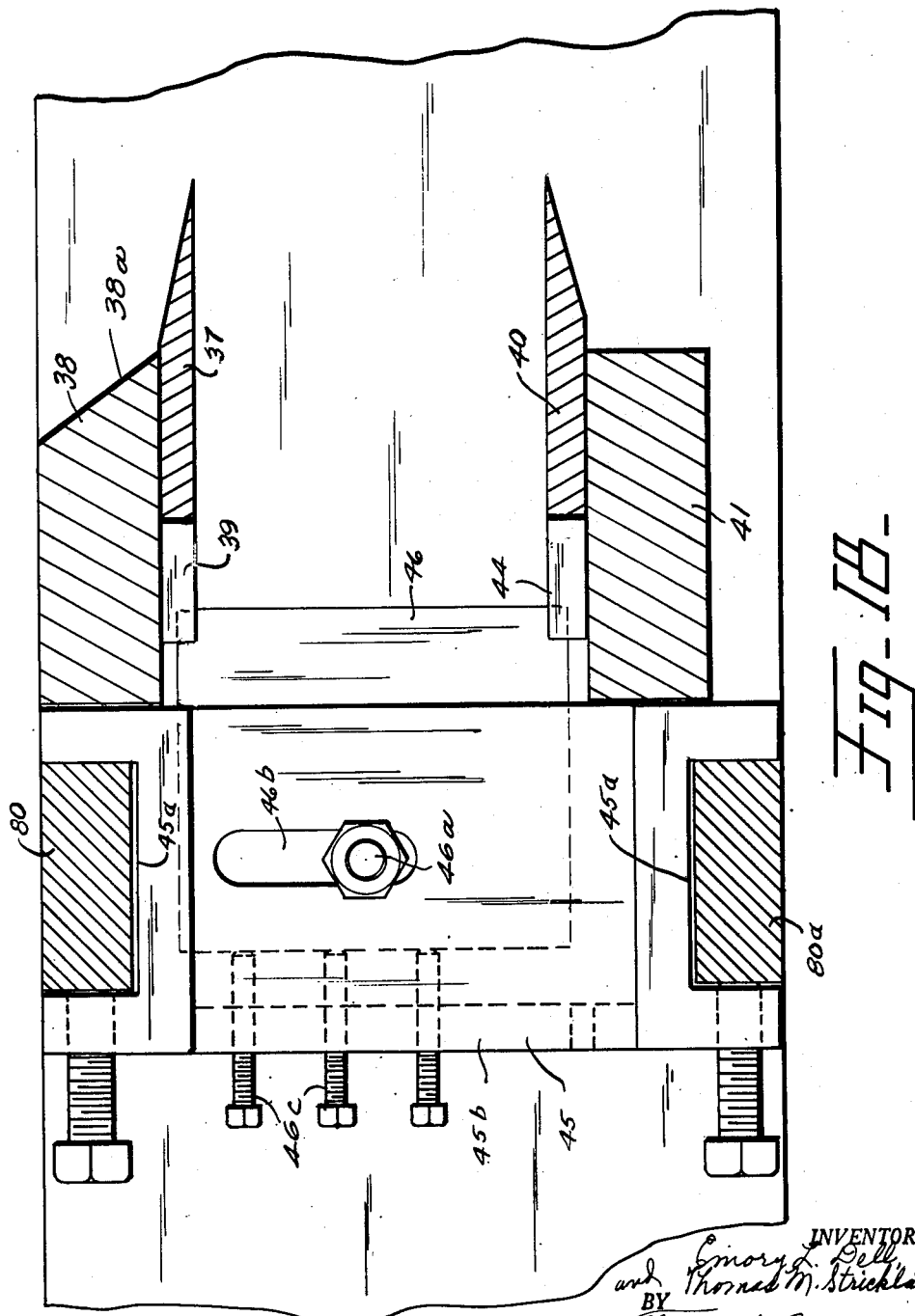

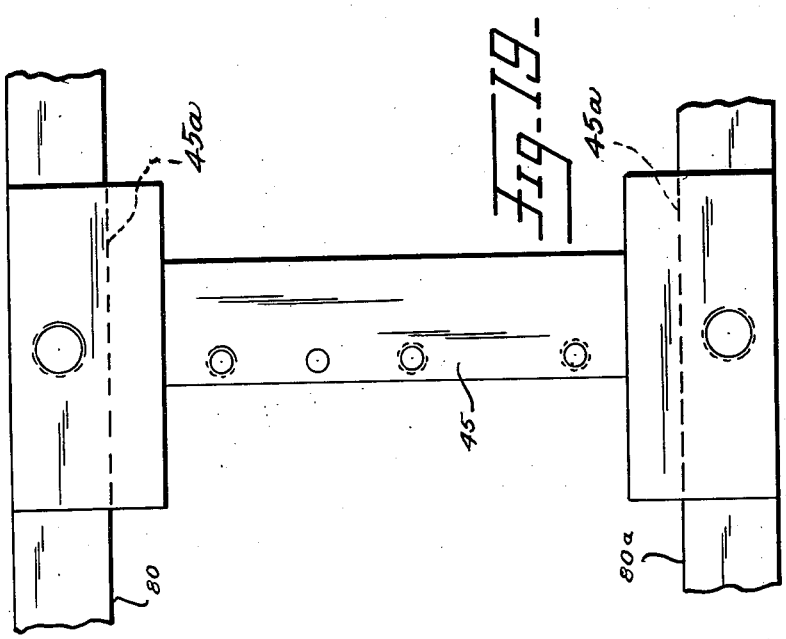
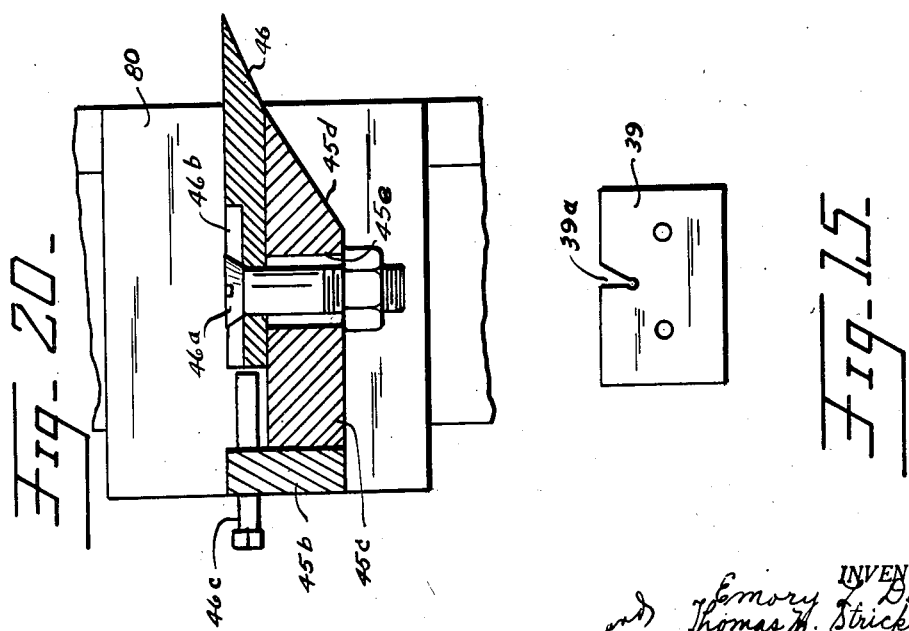

Patented Apr. 14, 1953

2,634,772

UNITED STATES PATENT OFFICE 2,634,772

VENEER SIZING MECHANISM

Emory Loyd Dell, Jr., and Thomas Marion Strickland, Waycross, Ga.; said Strickland assignor to said Dell, Jr.

Application January 17, 1947, Serial No. 722,492

20 Claims. (Cl. 144—159)

This invention relates to veneer sizing mechanisms, and has particular relation to mechanism designed to provide the areal dimensions of veneer elements.

Heretofore it has been the customary practice to saw the side and end edges of the seasoned veneer. The sawing of the end edges requires at least two operations even in situations where the sawing mechanism was of the gang type. In the case of forming the veneer for use in hamper constructions, the number of operations was necessarily increased in view of the fact that the side edges require separate sawing action.

An important object of this invention is to provide a veneer sizing machine which will overcome the above and other objectionable features.

Broadly, our present invention is designed to provide sizing operation by a cutting rather than by a sawing operation, the mechanism of the invention being designed to cut both the side and end edges of the veneer as a continuous operation, by moving the veneers through a cutting zone of the machine and employing individual knives for each of the side edges, as well as individual knives for the end edges, the cutting zone being so arranged that the dimensions between opposite knives may be varied by the adjustment of the knives.

In practice, the veneer blanks are advanced toward and into contact initially with the knives which cut the side edges, doing this simply by the advance of the blanks relative to the stationary knives; the blanks continue to advance and are brought into contact with the end knives which provide the cutting of the ends.

A further object of the present invention is to provide a sizing machine wherein power driven means is provided for advancing the blanks in an edgewise supported position to side edge cutting knives and end edge cutting knives rearwardly of the side edge cutting knives and means movable laterally of the travel path of the blanks in the same plane as the side edge cutting knives to prevent retrograde movement of the advanced blanks.

Yet another object of the invention is to provide a veneer sizing machine wherein the side edge cutting knives are spaced apart a distance equal to the width of the veneer element, one of the knives being supported for vertical adjustment by means adjustably carried by the support of the other knife.

Another object is to provide mechanism of this type which is simple and efficient in operation, which is operated under safety conditions, and which provides for superior results through the fact that the cut surfaces are provided by knife action with its smoothness of cut as contrasted with the inevitable markings left by the use of sawing action.

To these and other ends, therefore, the nature of which will be better understood as the invention is hereinafter disclosed in detail, said invention consists in the improved constructions and combinations of parts described in detail hereinafter, illustrated in the accompanying drawings, and more particularly pointed out in the appended claims.

In the accompanying drawings, in which similar reference characters indicate similar parts in each of the views—

Figure 5 is a detail vertical sectional view taken on line 5—5 of Fig. 3.

Figure 6 is a detail vertical sectional view taken on line 6—6 of Fig. 4.

Figure 7 is a sectional view similar to Fig. 5 showing the upper knife arranged for cutting "hamper stave" veneers.

Figure 8 is a detail sectional view taken on line 8—8 of Fig. 7.

Figure 9 is a partial vertical sectional view taken longitudinally of the supporting element for the lower knife.

Figure 10 is a detail sectional view taken on line 10—10 of Fig. 9.

Figure 11 is a side elevation on an enlarged scale of the mechanism for operating the material latch mechanism.

Figure 12 is a detail of one of the swinging arms of the material latch mechanism.

Figure 13 is a plan view of the upper knife supporting block.

Figure 14 is a plan view of the upper knife.

Figure 15 is a plan view of a transfer bar section.

Figure 16 is a detail face view of the blank advancing head.

Figure 17 is a sectional view taken on line 17—17 of Fig. 16.

Figure 18 is an elevational view partly in section of the horizontal and vertical knives.

Figure 19 is a rear view of one of the end-knife supports.

Figure 20 is a horizontal sectional view of one of the vertical knives and its component parts.

Figure 1:
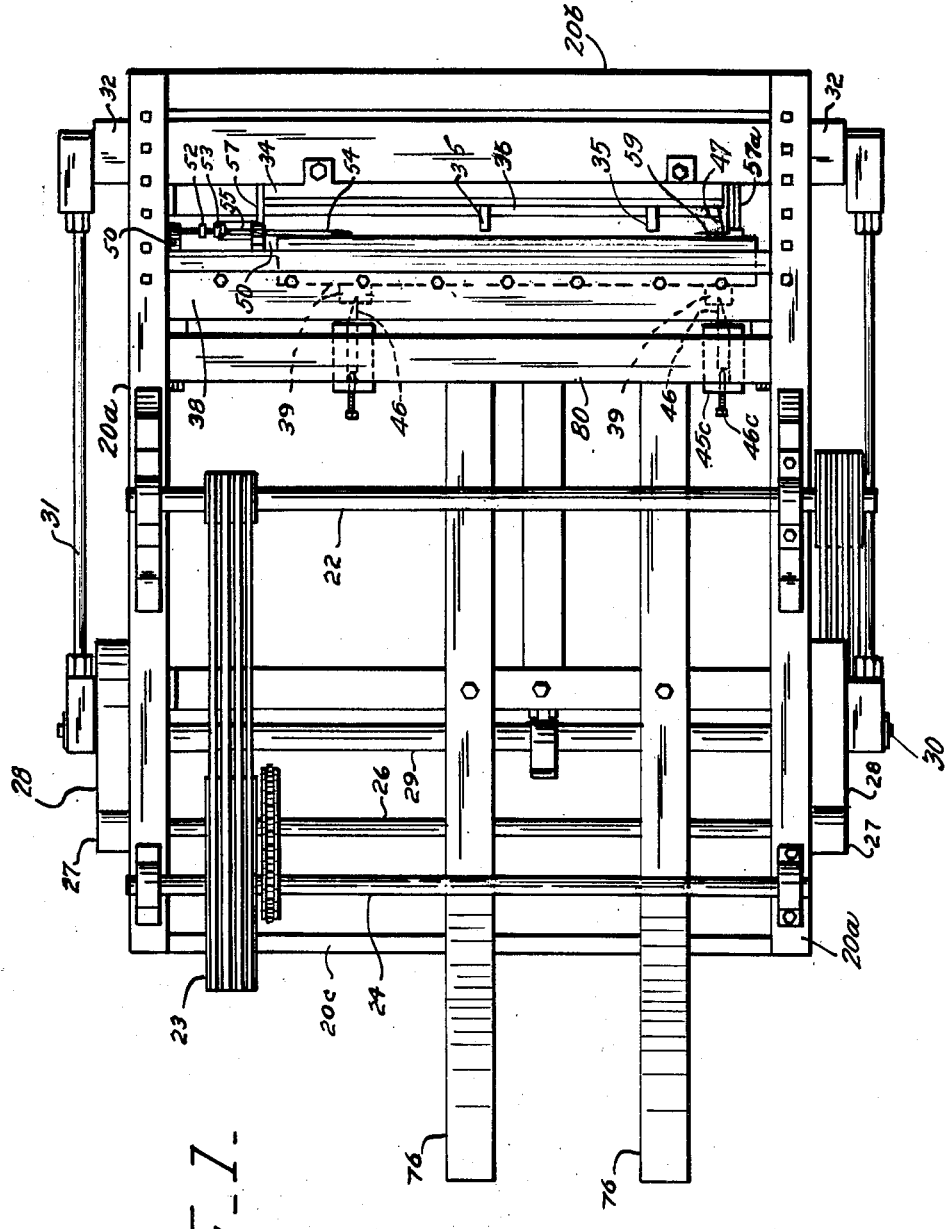
Figure 1 is a top plan view of the sizing mechanism.
Figure 2:
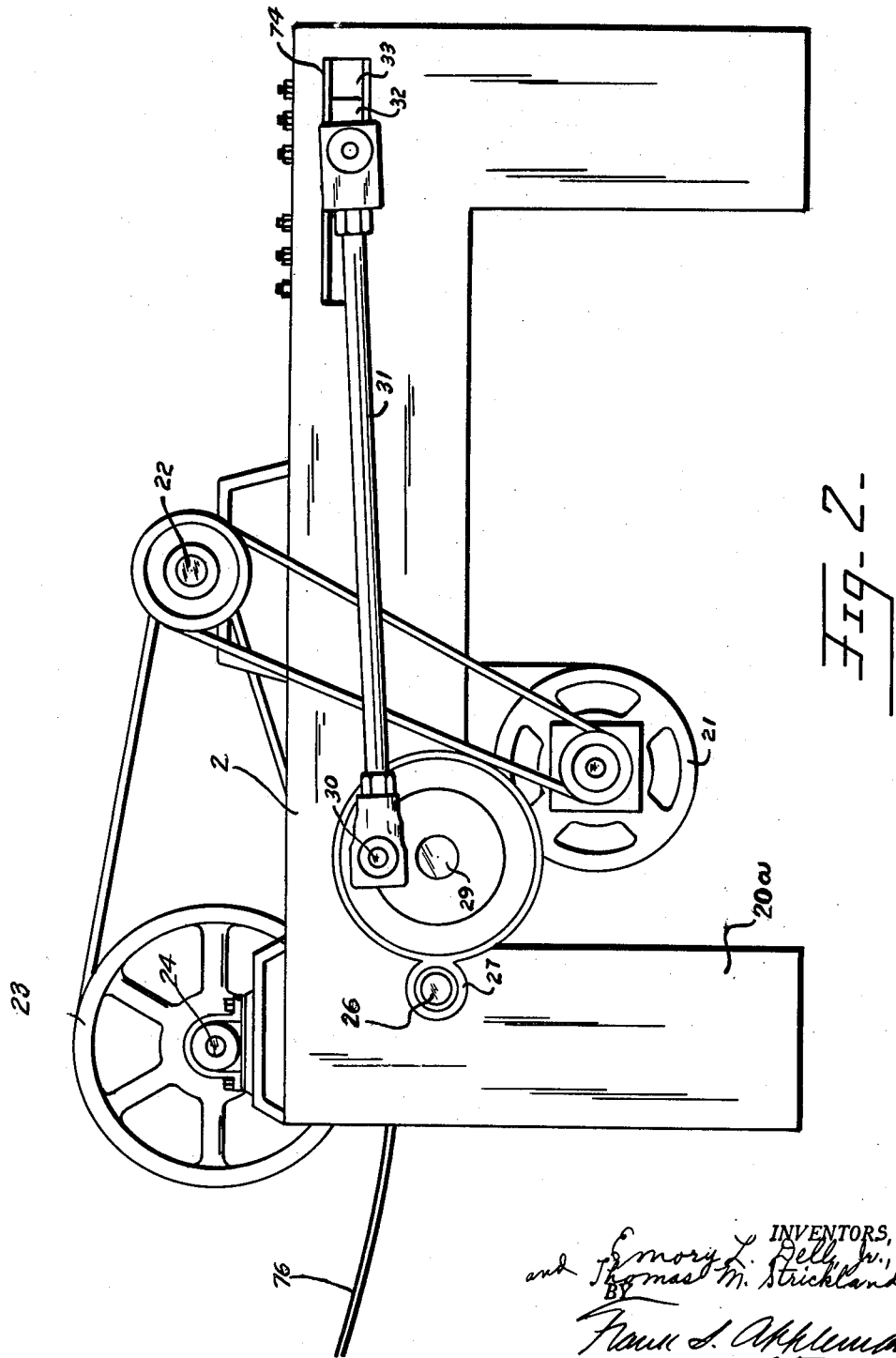
Figure 2 is a side elevation thereof.
Figure 3:
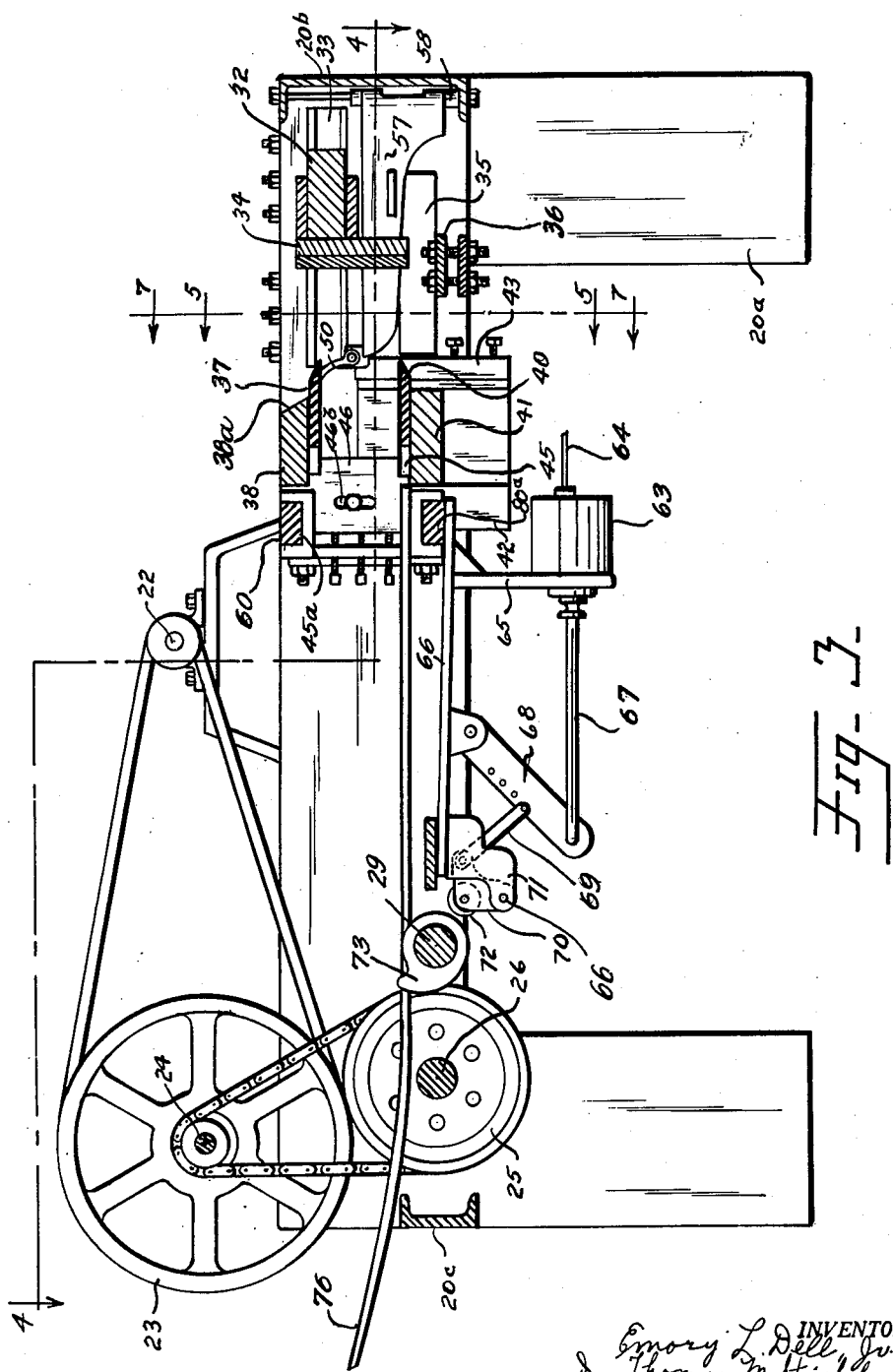
Figure 3 is a central longitudinal section thereof.
Figure 4:
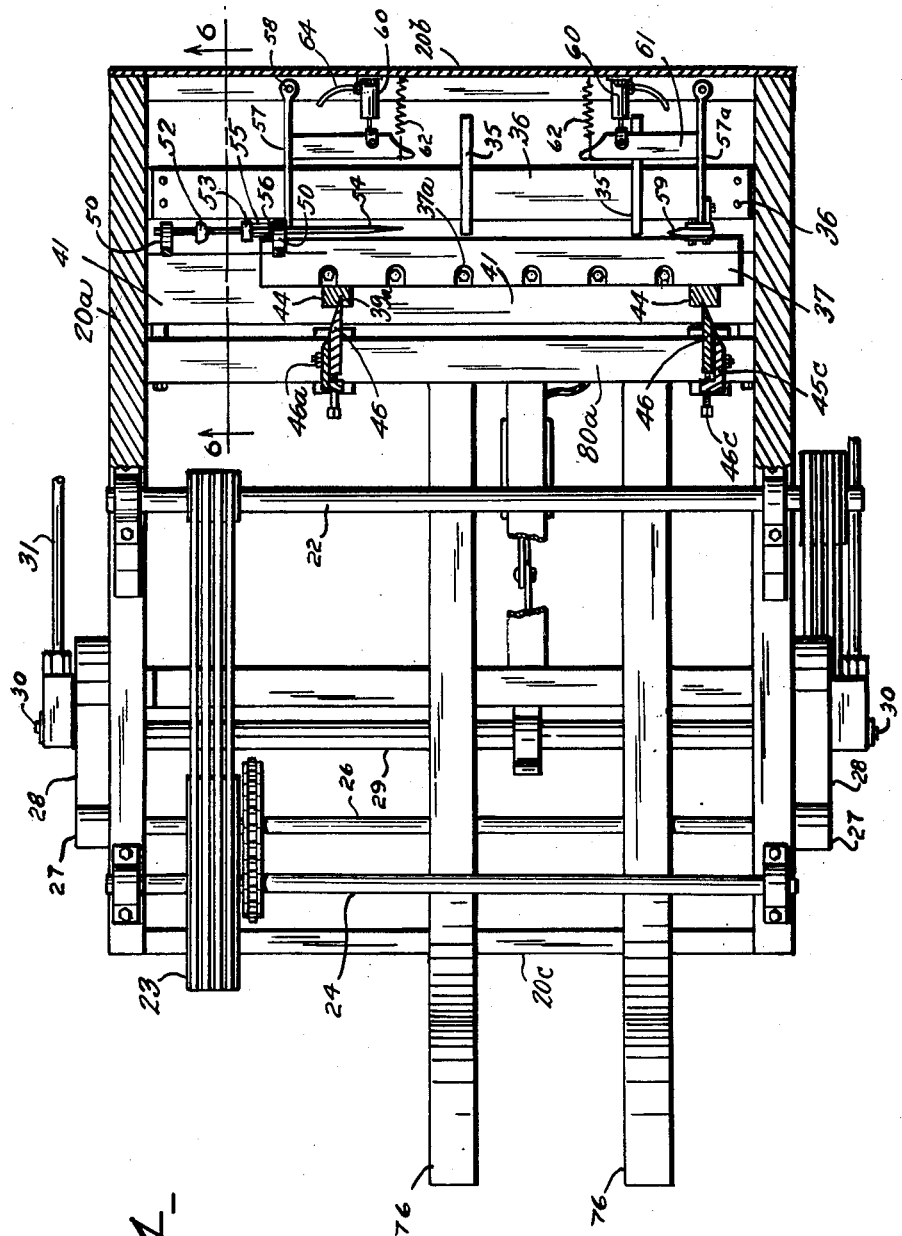
Figure 4 is a horizontal sectional view taken on line 4—4 of Fig. 3.

In connection with the detailed description of the machine and its operation, certain conditions are present which could lead to a possible misunderstanding of terminology employed; to avoid such confusion, the present explanation is given:

The end of the machine at which the operator takes his position in feeding or locating the blank within the machine, is considered the front of the machine, the opposite end being the rear of the machine; in practice, the blanks pass from such front end to the rear end, or in a direction away from such front end. As a result, the term "advance" has practically a double meaning in the explanation. For instance, the blanks in advancing through the machine, pass from front to rear of the machine; on the other end, the fingers heretofore referred to are located slightly forward of the plane of the cutting edges of the upper and lower knives, while the cutting edges of the end knives are some distance in rear of such plane, so that in this respect, "advance" would refer to the direction toward the front of the machine, while in connection with the movement of the blanks, such direction of advance would be away from the front of the machine. Hence, in the following description, the term "advance" when used in connection with the blanks is designed to refer to the movement of the blanks in the direction away from the front of the machine, while, in the description of the mechanical parts of the machine, the term will refer to a direction toward the front of the machine, excepting where a specific element or assembly has an advancing and retreating movement in directions varying from that of the front to rear, the term "advance" will refer to the direction of movement toward the active operating position of such specific structure, with "retreating" referring to movement in the opposite direction.

A suitable frame 20 supports the mechanism of the machine, this frame being supported at a suitable height by the use of standards or other form of support, the frame being formed of opposite side members 20a, and a front member 20b, these being of similar height, and a rear member 20c of less height but with its lower margin on the horizontal plane of the remainder of the frame. In contour, the frame is oblong with greater length from front to rear. The frame is suitably braced intermediate its ends by suitable connecting members which are secured to the sides, and also by shafts, etc. which extend across the machine at various points. Any suitable power may be provided, but it is shown as in the form of an electric motor 21 located below the plane of the frame and having a drive connection to a shaft 22 supported in brackets carried by the top of the sides of the frame approximately midway of the length of the latter. From shaft 22 a drive is provided with a suitable pulley 23 mounted on a shaft 24 located in the rear zone of the machine and supported by the top of the side frames, shaft 24 being operatively connected with a driven element 25 carried by shaft 26, the latter forming what may be considered as the principal shaft of the mechanism, this shaft being mounted in the sides of the frame and materially below and slightly in advance of shaft 24. The particular arrangement of drive is designed to reduce the speed of shaft 26 so that a motor drive of sufficient power to provide the various operations may be employed and yet provide for operating speeds of the critical active parts such as will ensure efficient operation. It will be understood, of course, that other forms of power may be employed, in which case the drive connections pointed out may be varied to accord with the type of power employed, it being understood, however, that the speed of shaft 26 is approximately the same in all cases.

Shaft 26 carries a small gear 27 at each end outside of the side frame members, said gears meshing with large gears 28 also located outside of the side frame members and mounted on a shaft 29 which connects the gears 28. The gears 28 are, in effect, the equivalent of crank arms, through the presence of a crank pin 30 positioned off-center of gear 28 with the location of the pins similar with respect to both gears. Each pin carries a pitman 31 the opposite end of which is in the front zone of the machine where each is connected with a cross head 32 adapted to move in and be guided by slotted ways 33 carried by the opposite side frames. These cross heads may be carried by or formed integral with the head or platen 34.

As will be understood, the rotation of gears 28 will cause both pitmans to concurrently advance and retreat the head in a true horizontal plane through the movement of the pins 30 in traversing their orbital paths.

This particular drive of the head is preferred because of the fact that it provides for a variation in speeds of the head, it being readily understood that as the pin 30 approaches, passes and recedes from the zenith and nadir points, there is a change in direction of movement of the pitman, the actual change taking place in such zenith and nadir positions, with the speed decreasing toward and increasing away from such points; the maximum speed is, of course, in the mid zone between such points.

The advantage of this lies in the fact that in the motion of the head toward the cutting zone—the advance toward the forward position of the head—there is time length sufficient to provide for the proper feeding and positioning of the batch of blanks; the action at the other end of the stroke of the head is similar, so far as speed is concerned, so that as the head approaches the actual cutting zone and nears the limit of the stroke, the movement of the head decreases to the point where pins 30 are passing the dead center point, at which time the head movement in such direction ends and the head begins to move in the opposite direction; since the latter action brings the face of the head in practical contact with the cutting edges of the advancing knives, this speed reduction at such time acts to preserve the knives against excessive deterioration. To aid in the latter result, the face of the head is preferably formed of soft metal, into which the cutting edges may readily penetrate to a slight extent initially, after which succeeding operations will simply enter the markings, due to the fact that the head is traveling in a single plane.

The head 34, shown in detail in Fig. 16, is carried by the cross head 32, and is generally oblong in contour with the greater length extending transversely of the machine; this head is plate-like in form and with the width extending vertically, such width being somewhat greater than the greatest width of veneers which would be operated upon within the machine, while the actual length exceeds somewhat the maximum length of the blanks. The plate 34a of the head forms the working face of the head, and the rear face of the plate is provided with marginal portions 34b extending rearwardly of the head, these marginal portions being undercut to permit of the positioning therein of a soft metal (such as Babbitt metal) which presents the face which will contact the upper and lower knives when the head reaches the end of its stroke in the direction of such knives. The end zones of plate 34a are provided with slots 34c extending inward from the end, one of said slots being of greater length than the other, these slots being adapted to permit the fingers, presently referred to, to enter and thus be forward of the last blank of the batch which had just been advanced to the upper and lower knives. The plate and head also carries vertical slots 34d in its lower zone and extending to the lower edge of the plate, these slots being designed to receive the supporting bars 35 carried by a supporting structure 36 extending transversely of and secured to the side members of the frame. As presently explained, the lower knife is vertically adjustable, and hence the supporting bars 35 are also made vertically adjustable through the specific form of supporting structure 36 which enables the bars 35 to be raised and lowered the proper distances, the structure 36 having a sufficient width to permit ample support to maintain the blanks against rocking motion, the bars having a length at least equal to the length of the stroke of the head.

The cutting zone is located at an intermediate point in the length of the machine, and presents four knives, two of which (the upper and lower) extend in horizontal planes, while the remaining two (the end knives) are located to operate between the planes of such upper and lower knives, the end knives extending in vertical planes, thus providing for cutting the four edges of the blank. Of the upper and lower knives, the upper knife has a generally fixed position, while the lower knife is adapted to be adjusted vertically to accommodate for the cutting of veneers of different widths. Structurally, the upper knife, indicated at 37, is supported by a cross member 38 fixedly carried by the sides of the frame, this member having its forward face inclined rearwardly toward the top, as at 38a, and is provided with a plurality of openings in the vicinity of the upper edge, these openings being designed for the purpose of removably securing the upper knife to the lower face of the member; in addition, the member has additional vertical openings, some of which are designed to permit the attachment of sections of a transfer bar, presently referred to, while others are designed to receive adjusting members, bolts, etc., for instance, by means of which the support for the lower knife is made adjustable relative to the upper knife.

The upper knife 37 has its forward edge sharpened, and has its rear zone formed with open-ended slots 37a positioned to accord with openings in member 38 to thereby permit firm anchoring of the knife to the under face of the member 38. The beveled face of knife 37 extends upwardly, thus leaving the lower face of the knife extending in the horizontal plane of the cutting edge, the beveled face of the knife not only providing for sharpening the knife, but also providing a face which can direct the trimmed off portion of the blank upwardly away from the blank, the inclined face 38a also serving to still further raise such excess trimmed portions on the upper side of the blank, thus tending to avoid possible difficulties from such excess material during travel of the blank toward the end cutting knives which are made active on the blank subsequently. To support the knife 37 against movement rearwardly under the pressure of the blanks during cutting thereof, a transfer bar 39 of short length is secured to the lower face of member 38 and in contact with the rear edge of knife 37, two of such bars being employed one for each end knife zone. Hence, the upper knife is held rigidly and capable of withstanding any pressures that may be placed upon its cutting edge as the blanks engage the latter by the movement of the head 34.

The lower knife 40, which is practically a duplicate of the upper knife 37, is similarly mounted on the upper surface of a holder 41 which extends across the machine and is mounted between vertical guides 42 and 43; the holder 41 is enlarged vertically at its ends, as at 41a to provide an extended surface which coacts with the guides and the side frames to provide a stable positioning of the holder while permitting its vertical adjustment, the holder being supported from the upper block 38 by a bolt construction—indicated at 48—so arranged as to permit of shifting the holder vertically and to maintain it in its shifted position. Holder 41 also carries a pair of transfer bars 44 in rear of knife 40 to support the knife in a manner similar to that of transfer bars 39 relative to the upper knife. Obviously, the beveling of the cutting edge of knife 40 is opposite that of knife 37, the arrangement being such that the cutting edge of knife 37 is on the lower plane of such knife, while the cutting edge of knife 40 is on the upper plane thereof, the result being that the space between the two knives is entirely unobstructed, and is equal to the distance between the two cutting edges. As a result, the blanks which are advanced into contact with such knife edges are cut to uniform width of blank, the latter then passing into the space between the two knives and advancing within this space—which forms a throat—toward the rear of the machine; since the throat has the width equal to the maximum length of the blanks, the latter will be held from tilting forwardly or rearwardly while traveling through the throat.

The supports for the vertical knife holders are located to the rear of and spaced from the member 38 and support 41, these being shown as two members 80 and 80a which extend between the side members of the frame, member 80 being located at the top and mounted to be removable from the frame for the purpose of permitting the positioning of parts which are carried by these two members, while member 80a, located at the bottom of the sides of the frame is designed to be maintained stationary in position; both members, however, in service, are rigidly secured to the frame and provide a fixed distance between them, this distance being somewhat greater than the maximum distance possible between the front upper and lower knives.

Members 80 and 80a are designed to support a pair of holders 45, shown more particularly in detail in Figs. 18 and 19, each being formed with an upper and lower open zone 45a which respectively receive members 80 and 80a when the holders are properly positioned on said members 80 and 80a. Such end portions of the holders are of extended length laterally to provide rigidity, and each is tapped to receive a set screw which is designed to permit the holders to be adjusted lengthwise of members 80 and 80a; said end portions are connected by a web 45b of less width than the length of such end portions, said web carrying a forwardly extending support 45c which is designed to support the vertical knife 46. Support 45c has its forward edge beveled as at 45d, the angularity of which continues the general angularity of the beveled face of the knife 46, these providing for shifting the cut off ends of the blanks away from the completed veneers. Support 45c also presents an elongated vertically-extending slot 45e designed to receive the bolt 46a which secures the vertical knife in position on its support 45c, the vertical knife being recessed at its rear as at 46b and provided with a countersink, for the reception and adjustment of bolts 46a, slot 45e having sufficient width to permit front to rear adjustment of the knife 46 to enable sharpening of the knife when necessary. The knife is supported against the cutting pressures of the blanks by set screws 46c extending through the web 45b.

In practice, the arrangement is such that each of the end knives 46 is slightly inclined in the front to rear direction to provide its inner face as a gradually expanding zone between the opposing knives, the inclination being small but sufficient to prevent binding of the blanks as they pass beyond the cutting edges.

In practice each knife 46 has a length greater than the distance between the upper and lower knives 37 and 40, the excess length being designed to assure proper action in case warped condition of the blanks would tend to provide difficulty. Such excess length is at the opposite ends of the knife and is designed to extend into a notch 39a of the transfer bar sections 39 which are secured to the knife-supporting face of member 38 and support 41, each section of the bar being adjusted in position lengthwise of such face to correspond to the adjusted position of the end knives.

While it is possible that the knife length may be based on the maximum width of the blanks possible to be produced by the machine, it is preferred that each general width of blank would have its individual knife length, thus providing for a plurality of sets of end knives, each set being designed to be used in connection with a general blank width. Slot 45e will permit variations in positions as well as substitution of knives provided by the vertical adjustment of support 41.

The material stop 47 is carried by one end of the head 34 and has a length to project away from the face of the head a distance sufficient to assure that all of the blanks which may be within the batch positioned by the operator, can be brought into contact with the inner working face of the stop.

Such inner working face is preferably inclined outwardly away from the face of the head. While the latter arrangement would tend to produce an uneven positioning of this end of the blanks, this condition is not detrimental, since the length of the blanks is somewhat in excess of the length of the finished veneers, so that the inclination of the face simply varies the length of the excess which is cut from this end of the blank and which becomes waste.

The advantage of the inclination of such face comes from the fact that while the stop 47 advances with the head and thus passes beyond the cutting plane of the upper and lower knives and may reach the cutting plane of the end knives as the head advances to bring the last blank of the batch into its cutting position relative to the upper and lower knives, the head then moves in the opposite direction, leaving the blanks in their advanced position. Obviously, if the ends of the blank were accurately alined and in complete contact with the face of the stop, this retrograde movement of the head and stop could set up a frictional engagement between the stop and the ends of the blanks, with the result that such movement could tend to break down the formation of the blanks produced by the initial movement of the head. By providing the inner working face with the stop inclined, all danger of frictional engagement is eliminated the instant the head begins such retrograde movement, leaving the blanks in their proper relationships for efficient action in connection with the end cutting knives, the stop losing its contact with the ends of the blanks in immediate succession to the change in direction of movement of the head 34.

As heretofore referred to, the mechanism includes an arrangement which is referred to as a "material latch," this being in the form of a pair of fingers located slightly forward of the vertical plane of the cutting edges of the upper and lower knives, the purposes of the latches being primarily to retain the blanks of the previous batch against retrograde movement when the head is being returned to its inactive forward position, a condition which would be likely should the batch include warped blanks. One of these latches is located in the end zone of the blank that is adjacent the material stop 47, and is therefore of short projected length; the latch for the opposite end of the blanks, however, is of considerable length, due to the fact that it must be operative under all of the length conditions of the blanks, and hence needs adjustment characteristics, since the active projected length of this latch is designed to be equal to that of the opposite latch. Both latches are designed to be moved into and out of such projected position, to meet the service conditions, and hence the mechanism includes structures operative to not only provide for such advance and retreat of the latches, but also to time such movements. This assembly will now be described in detail:

Referring first to the adjustable latch, 50 indicates a pair of supports carried by a face of block 38, beyond the travel path of this end of head 34, these supports being spaced apart and leading downwardly past the forward face of block 38, each support terminating in a guide 50a apertured to receive a rod-like member 51 which carries an adjustable stop 52, active to limit the movement of the rod in the direction to remove the latch from its active position. The rod also carries a second member 53 adjustably mounted on the rod and which carries the latch finger 54 and also a pair of connecting members 55 which lead to and are secured to a block 56 which is carried by the outer end of a swingable arm 57, the opposite end of which is pivoted, as at 58, to the forward end frame. As is apparent, if the element 57 is swung on its pivot in one direction, it will move block 56 and member 53 in the same direction, thus moving rod 51 in such direction until member 52 contacts the guide 50; such movement of member 53 will move latch finger 54 in the same direction and thus move the free end of the finger out of the path of the blanks; after the completion of this movement and at the proper time, the element 57 swings back to its former position, thus moving the finger to its position where its end zone will extend into the path of travel of the blanks.

The latch finger 59 at the opposite end of the blanks is comparatively short in length and is suitably supported on a similar element 57a located in such end zone, this finger having timed movements similar to those of finger 54 but in the opposite direction, so that the two fingers are concurrently moved into and out of the path of travel of the advancing blanks. Elements 57 and 57a are mounted to have their swinging movements below cross head 32 beyond the ends of head 34.

Elements 57 and 57a are given their swinging movements through the operations of a fluid system which includes a pair of cylinders 60 of the dash-pot type, the piston of which has its rod connection secured to an arm 61 carried by and movable with the respective elements 57 and 57a, each rod having its individual cylinder. Obviously, if a liquid such as oil be introduced into the cylinder, it will operate to shift the piston of the cylinder outward and thus swing the element on its pivot; if such fluid be withdrawn from the cylinder, the element can swing back to its former position, and to provide this result, a spring 62 is mounted at the free ends of each of the arms 61 and connected with the forward frame members, this spring being expanded when oil is introduced into the cylinder and, in turn, serving as a power source for returning arms 61 and at the same time forcing oil from the cylinder by the movement of the cylinder piston.

To provide this supply of oil to the cylinders, the two cylinders 60 are operatively connected with a master cylinder 63 mounted below an intermediate portion of the machine and connected to the cylinders 60 by copper tubing 64. Master cylinder 63 is carried by a depending arm 65 of a bracket 66 secured beneath the frame and is of dimensions sufficient to provide the amount of fluid required for the operation of cylinders 60; in practice, cylinder 63 may be a standard automobile master cylinder, this being provided with the usual piston, the rod of which is indicated at 67, the free end of which is secured to a downwardly extending pivotally supported arm 68 operatively related by a connection 69 with one of the angles of a triangular member 70 pivoted within a housing 71 carried by the support 66, member 70 carrying at the third angle a roller 72 which is adapted to cooperate with a cam 73 carried by shaft 29, the cam being so shaped that during its rotation, there will be a gradual movement of the roller 72 away from the axis of shaft 27, thus rocking the triangular member 70 to advance arm 68 through connection 61 and advance the piston of the master cylinder in a direction to force oil content thereof through the copper tubing into the cylinders 60 and thus shift the two fingers 54 and 59 to their outer positions. As the cam continues its advance, its contour reaches a point where the pressure applying face reaches its end, and thus frees roller 72 from the pressure activity and permits the roller to return to its initial position; when such pressure is released, springs 62 become active to force the oil from cylinder 60 into the copper tubing and return to the master cylinder by forcing the piston of the latter outwardly and thus through the train of connections, moving roller 72 into its original position.

The facing for the head 34 is in the form of an applied member secured to the exposed face of the head as indicated in Figs. 16 and 17, the applied member having the slots 34c, together with the soft metal portion which provides the face with which the upper and lower knives are brought into engagement by the movement of the head in advancing the batch of blanks, such active face being of soft metal such as Babbitt metal, thus providing for ready renewal of the face when necessary, and also being less likely to dull the cutting edges of these knives, especially in view of the fact that the movement of the head is in a definite horizontal path, and the knives are in fixed position; hence, the marking left by the cutting edge in the initial movement will receive such edge during subsequent cycles as long as the blank width remains constant.

Due to the fact that the length of the head must be such as to provide for the cutting of maximum lengths of blanks, while the service conditions may include operations on blanks of materially shorter length, provision must be made for positioning of fingers 54 and 59 relatively to blanks of the shorter length, this being provided by the adjustability of finger 54 as previously pointed out, the length and adjustment of this finger being such that when in active position it will extend into the path of travel of the blanks, regardless of the length of the latter, the adjustment of finger 54 being designed to compensate for the fact that its arm 57 is of fixed arcuate swing; while arm 57a also has a fixed arcuate swing, finger 59 has a definite and constant range of movement and will therefore swing between the same positions during successive swingings of the arm; since such swinging movement would cross beyond material stop 47, the latter is secured to the head in a position above the path of travel of the fingers.

In practice, the contour of the cam 73 and its location on shaft 39 produces a timing of movements of roller 72 in a definite cycle substantially as follows:

Assuming the head 34 as being in its position adjacent the forward end of the machine, thus providing the space to receive the blanks, the fingers will be in their active positions, being in rear of the blanks previously advanced; such position provides the "low" zone of the cam contour. While the movement of the head out of such position is initially slow but gradually increasing, due to the drive mechanism passing through the nadir zone of travel of the crank 30, shaft 29 is moving at constant speed and hence advancing the cam in its direction of rotation. It is during this period that the new batch of blanks is being inserted into this space by the operator and brought into contact with the material stop 47, thus providing the possibility of an indefinite thickness of the batch—the thickness being dependent upon the number of blanks within the batch—with the result that the timing of the retracting movement of the fingers must be such as to carry the fingers out of the path of the advancing blanks to avoid the fingers interfering with the advance of the blanks of the batch. Hence, the contour of the cam is such that at a suitable and intermediate point in the stroke of the head, the cam contour begins a slow advance of roller 72 to provide a gradual action of the master fluid cylinder and cylinders 60 to provide a gradual shift in the angularity of arms 57 and 57a and thus gradually move the fingers in the directions of their inactive positions, the ends of the fingers leaving the path of travel of the blanks as the advance face of the positioned batch is approaching the fingers, the timing being so arranged that the fingers will remain in position to prevent the blanks of the previous batch from moving in a retrograde direction but at the same time providing movement of the fingers out of the path of the advancing blanks. In other words, while the shifting of the fingers to active position is provided somewhat rapidly as the cam movements relieve roller 72 from pressure, the retreating movements of the fingers can be sufficiently slow as to insure the retaining of the previous blanks in their throat positions while the succeeding batch is being inserted, positioned and being advanced.

While this could imply an intricate form of cam to insure the passage of the fingers out of the path of the oncoming blanks, such special form of cam contour to produce this result is practically unneeded through the fact that at the same time, the head is approaching and passing through the zenith zone of travel of the crank pin 30 so that at such time the bodily movement of the head is at a slow rate so that the constant rate of advance of the cam will permit the proper operation.

As will be understood, the free ends of fingers 54 and 59 are outside of the path of advance of the positioned blanks when the fingers are in their inactive position produced by the activity of the cam 73 and by the gradual rise of the cam at such time, this position of the fingers being provided as the head approaches the end of its stroke. At such time, portions of the body of the fingers may extend within the path of travel of the head—especially finger 54—in which case such portions of the fingers will simply pass into the slots 34c as the heads advance. The timing of the cam is such that when the head has moved to the end of its blank-advancing stroke, the roller 72 is released from cam pressure to thereby permit springs 62 to become active to shift the arms 57 and 57a, whereupon the fingers move to their active positions, this movement causing the fingers to pass within slots 34c and behind the positioned blanks, so that as the head returns to its inactive forward position, the batch of blanks will be kept from retrograde movement by the fingers then in active position behind the rearmost blank of the batch. As heretofore indicated, the fingers retain such position behind the blanks, although the free ends of the fingers are gradually moved in the direction to withdraw them until the fingers reach their inactive positions.

Since the movement of the head 34 must be properly developed as to direction to assure uniform widths of the veneers, guides 33 are so arranged as to permit the exact positioning of the walls of the guides, this being provided by the use of gibs 74 between which the cross head has its movement, the upper gib being arranged to be accurately and properly adjusted through the use of studs and set screws.

As heretofore referred to, the mechanism is also designed for the production of the veneers or staves of the type known as hamper staves, these being utilized in the formation of baskets and the like, as heretofore pointed out. These staves have their side edges extending in directions angular to each other, thus tending to produce a structure that is somewhat taper-like.

To produce this result, the machine is so arranged that the upper knife is shifted out of parallelism with the lower knife by the use of a tapered shim 75 which is arranged to be placed between block 38 and the upper knife 37 and its transfer bars 39, the shim having a length at least equal to the length of the upper knife 37 and having perforations to permit the passage of the bolts or other knife-securing structure through the shims, the shims being tapered from end to end. The appropriate end knife may be mounted to compensate for the variation in width of the ends of the stave blank.

As a result, knife 37 will cut the upper edge of the advancing blanks at an angle to that provided by the lower knife, without, however, affecting the action of the end knives, the notches of the transfer bar permitting the necessary adjustment of upper knife 37 and its transfer bar 39, the taper development of the shim being such as to provide the desired angularity of the opposite side edges of the blanks.

The machine includes two or more rearwardly extending members 76 leading rearwardly from the rear of the transfer bar of lower knife 40 past the rear end of the machine. The upper face of these members 76 is positioned in substantial alinement with the upper face of the lower knife 40, and the projecting portion of the members may be inclined upwardly to a more or less extent, as shown. These members are designed to support the completed veneers after they have left the throat of the cutting mechanism, and are designed to retain the veneers in their proper positions until they pass off the ends of members 76 onto an inspection table (not shown).

The operation of the mechanism has been described in detail above; however, a brief resumé is presented at this point:

With the head 34 at that end of the stroke which places the head adjacent the forward end of the machine, the operator picks up a handful of blanks and deposits them edgewise on the guides 35 ahead of the head 34; the comparatively slow movement of the head in this particular zone permits such positioning of the blanks and their proper positioning relative to the stop 47.

Since, as heretofore pointed out, the initial blanks have a width greater than the width of the veneer—in fact two or more times such width —the batch thus supplied by the operator will have the vertical length of its blanks extending materially above the head 34 due to the extra width of such initial blanks. It may be noted at this point that at such time the operator retains his hold upon the batch while it is being advanced and thus retains, as a batch, the portion of the initial batch which is above the upper knife; when the head 34 returns to its forward position adjacent the end frame, the operator then positions this retained portion of the batch within the space between the head and the upper and lower knives, thus, in effect, presenting the equivalent of a new batch; if the initial width of the blank was sufficient to provide for three of the blanks, the operation thus described is repeated with the residue left after the second portion of the batch has been cut.

In this way, it is unnecessary to initially form the blanks to approximate the width of the veneer, since it is possible for the operator to provide the stage cutting of the blanks from the initial blank without positioning a new batch of initial blanks. In the earlier stages the hand of the operator is positioned above the plane of the upper knife and therefore without danger of contacting such upper knife; with the last increment of the batch, however, the hand will extend somewhat below the upper knife and could therefore be damaged by the advance of the head and the batch—the material latches heretofore described are designed to provide the additional factor of tending to protect the operator against advancing the hand into close proximity to such knife edge.

Hence, a batch of embryo continues to advance, the forward blank of the batch contacts the upper and lower knife cutting edges and, due to the pressure provided by the head, the cut blank is moved past the cutting edges, thus fashioning the side edges of the cut blank to the desired width of the final blank; as the head continues to advance, this action takes place with respect to each of the embryo blanks as they come into contact with the knife cutting edges and then pass onward into the throat between the upper and lower knives, this action continuing until the head reaches the end of its stroke, a position which will have had the effect of completing the side edges of all of the embryo blanks of the batch. During this period, fingers 54 and 59 will be in their inactive positions outside of the path of travel of the blanks of the batch. When the head is practically in this end of its stroke, the fingers are released so as to move to their active positions and at the same time be within slots 34c, so that when the head begins its retrograde movement of the succeeding stroke, the slots will be withdrawn from the fingers and the latter will be in position behind the last of the blanks of such advanced batch, remaining in such position until the succeeding cycle brings a repetition of the preceding cycle through the positioning of the succeeding batch and its advance to be in turn acted upon by the upper and lower knives.

The blanks of the previous batch may or may not have reached the end knives in providing the above cycle—it will depend upon the number of blanks which formed the batch; if the end knives had not been reached during the advance of the batch itself, the advance of the succeeding batch which brings the front face of the batch into contact with the rear face of the last blank of the previous batch will provide pressure, through the movement of the head, to advance the blanks of the throat into contact with the end knives 46, the advancing blanks being acted upon individually similarly to the action by the upper and lower side knives, the result being that the ends of these blanks will be cut off to the desired length of the veneer, leaving the individual veneers complete as to the areal size.

As batch succeeds batch, there will be an advance of all veneers that had preceded the batch being advanced, the completed veneers passing on to member 76 and accumulating thereon, the entire power for such advance being provided by the movement of the head 34. The advance of the veneers is therefore an intermittent advance with the movement dwell spacing provided by the retrograde stroke of the head and the time required to bring the leading blank of the batch into engagement with the upper and lower knife cutting edges. During the period of dwell in the advance of the blanks, the fingers 54 and 59 are active to prevent any material retrograde movement of the blanks from the throat.

The operation of the machine is presented more particularly in detail in the above description. A brief statement of operational characteristics is now added.

In the above description, reference is made to the operator taking a "batch" of blanks and positioning these between the head and the cutting edges of the upper and lower knives. The number of blanks included in the batch will, of course, depend upon the individual thickness of the blanks, and the length of the stroke of the head; the experienced operator will readily ascertain the composite thickness of the batch which can be readily introduced, so that no material difficulty will be had in this connection. In addition, however, the presence of fingers 54 and 59 will aid in this respect, these fingers, in their inner positions having their opposing ends spaced apart at a distance materially less than the length of the blanks, thus preventing advance of the blanks beyond the fingers, while the latter have not been removed sufficiently to clear the ends of the blanks. As a result, the workmen will be able to only introduce a definite composite thickness of blanks without providing accidents to the machine, and such batch can be readily adjusted to position relative to the stop 47 without having the fingers reach a dangerous position relative to the knife-cutting edges.

The material being treated, first as blanks and then the veneer elements, has but the one direction of movement through the machine— an advancing direction. The advance is intermittently brought about by the fact that the blanks are introduced in batches with each batch having its initial cutting action before the succeeding batch is introduced; hence a time element for preparing the space to receive the succeeding batch is involved, the advance of the material under treatment being delayed during this period of positioning the succeeding batch. But, throughout the period of advance, the general condition of having adjacent blanks in facial contact is preserved, the exception to this being during the period in which the succeeding batch is being positioned and until the advance blank of the batch reaches the cutting mechanism and thus establishes contact between such blank and the previously treated blanks. Since the blanks are initially positioned to be supported on one of their side edges, this facial contact serevs to retain the blanks in such position even after they have passed through the throat provided in the cutting mechanism and are moving rearward of the machine toward the inspection table, this being assured through the upward inclination of the rear end of the blank support which tends to hold the blanks in such position.

The specific drive mechanism disclosed, is, of course, only a preferred arrangement, it being obvious that the drive can be provided in various ways, the essential being that certain characteristic features of the invention be maintained, as, for instance, the variations in speed of advance of the head, the timing of the protecting fingers, etc., these having been referred to previously.

As will be understood, the machine as an entirety will assure the production of sized veneer elements under fairly high production conditions, the speed of operation being generally controlled by the ability of the operator to properly position succeeding batches of blanks, the blanks, after positioning, following a more or less automatic sequence of activities such as to produce the finished product and in simple manner.

One important advantage, however, comes from the fact that the side edges and the end edges of the blank are cut rather than sawed as had been the prior practice. Where sawing is employed, the time consumed is largely increased in addition to which extreme care must be taken that the blanks be properly positioned if the edges are to have the desired right angular relation to the faces of the blank; with the present machine, the positions of the knives within the machine become a controlling factor in this respect, since these remain stationary to insure that successive blanks will have precisely the same treatment. Utilizing stationary knives, and the fact that the head advances in a true single-plane path assures that the blanks will have precisely the same treatment.

As will be obvious, the specific mechanical features which are used in producing the complete machine, have been generally described above; others which are concerned more particularly with the construction of the machine itself are omitted as being of general types of construction.

While we have shown and described a preferred form of mechanism for producing the service indicated, it will be understood that changes and modifications therein may be found desirable or essential in meeting the exigencies of use either as a sizing mechanism of the particular type indicated or under operations of a similar type and general purpose; and we desire to be understood as reserving the right to make any and all such changes or modifications as may be thus found desirable or essential, insofar as the same may fall within the spirit and scope of the invention as expressed in the accompanying claims, when broadly construed.

We claim:

1. A veneer sizing mechanism, wherein the veneer structure is produced from a blank having a preformed thickness dimension and an areal dimension greater than the similar dimension of the sized veneer structure, and wherein the sizing is provided by a cutting operation applied to the side and end edges of the blank during blank advance in constant direction to produce the width and length dimensions of the veneer structure, such sizing mechanism including a framework, a pair of spaced horizontally disposed knives located on the frame relative to the travel-path of the blanks to provide side-edge cutting of the blank, a pair of spaced vertically disposed knives supported by the frame rearwardly of the horizontal knives to provide end-edge cutting during the progressive advance of the blanks, power-driven blank-advancing mechanism for progressively advancing the blanks in edgewise-supported position in the blank travel-path to present the blanks progressively to the horizontal cutting knives, said advancing mechanism being operative to advance the blanks intermittently and incrementally with the mechanism movable to provide an increment-receiving space in advance of the horizontal knives to thereby permit positioning of a succeeding increment, and means movable laterally of the blank travel path in the same plane as the side edge cutting knives operative on the advanced blanks to prevent retrograde movement of such advanced blanks during the period of development of such space and the positioning of the succeeding increment.

2. Sizing mechanism as in claim 1 characterized in that the horizontal knives are spaced apart a distance equal to the width of the veneer element, said knives having their cutting edges facing the blank-advancing mechanism, the upper knife being secured to the under face of a block supported by the framework, the lower knife being supported by the upper face of a member extending from side to side of the framework and adjustable vertically relative to the framework, said member being adjustably supported from said block.

3. Sizing mechanism as in claim 1 characterized in that the horizontal knives are spaced apart a distance equal to the width of the veneer element, said knives having their cutting edges facing the blank-advancing mechanism, the upper knife being secured to the under face of a block supported by the framework, the lower knife being supported by the upper face of a member extending from side to side of the framework and adjustable vertically relative to the framework, said member being adjustably supported from said block, each knife being supported at its rear edge by a transfer bar, said bars being secured respectively to said block and said member.

4. Sizing mechanism as in claim 1 characterized in that the horizontal knives are spaced apart a distance equal to the width of the veneer element, said knives having their cutting edges facing the blank-advancing mechanism, the upper knife being secured to the under face of a block supported by the framework, the lower knife being supported by the upper face of a member extending from side to side of the framework and adjustable vertically relative to the framework, said member being adjustably supported from said block, the said member having its ends enlarged vertically to thereby provide extended contact with the side members of the framework, the framework carrying guide elements for restricting the adjustable movement of the member to a substantially vertical path.

5. Sizing mechanism as in claim 1 characterized in that the horizontal knives include an upper knife supported by a fixedly-positioned block carried by opposite sides of the framework, a lower knife carried by a member extending between opposite sides of the framework and adjustable relative to the upper knife, said knives each having a transfer bar carried by the supporting structure for the knife and active to support the knife against pressure on its cutting edge, said knives being spaced apart a distance equal to the width of the veneer element, said vertical knives having their cutting edges facing in the same direction as the cutting edges of the upper and lower knives, but with the vertical-knife cutting edges rearwardly disposed relative to a vertical plane which includes the cutting edges of the upper and lower knives, said vertical knives being spaced apart a distance equal to the length dimension of the veneer element.

6. Sizing mechanism as in claim 1 characterized in that the horizontal knives include an upper knife supported by a fixedly-positioned block carried by opposite sides of the framework, a lower knife carried by a member extending between opposite sides of the framework and adjustable relative to the upper knife, said knives each having a transfer bar carried by the supporting structure for the knife and active to support the knife against pressure on its cutting edge, said knives being spaced apart a distance equal to the width of the veneer element, said vertical knives having their cutting edges facing in the same direction as the cutting edges of the upper and lower knives, but with the vertical-knife cutting edges rearwardly disposed relative to a vertical plane which includes the cutting edges of the upper and lower knives, said vertical knives being spaced apart a distance equal to the length dimension of the veneer element, said vertical knives having their front to rear body portion extending at an angle, with the angularity of one knife opposite that of the other to thereby shift the excess material produced from the ends of the blank away from the travel-path of the completed veneer elements.

7. Sizing mechanism as in claim 1 characterized in that the horizontal knives include an upper knife supported by a fixedly-positioned block carried by opposite sides of the framework, a lower knife carried by a member extending between opposite sides of the framework and adjustable relative to the upper knife, said knives each having a transfer bar carried by the supporting structure for the knife and active to support the knife against pressure on its cutting edge, said knives being spaced apart a distance equal to the width of the veneer element, said vertical knives having their cutting edges facing in the same direction as the cutting edges of the upper and lower knives, but with the vertical-knife cutting edges rearwardly disposed relative to a vertical plane which includes the cutting edges of the upper and lower knives, said vertical knives being spaced apart a distance equal to the length dimension of the completed veneer element, said vertical knives each being supported by holders positioned on rear of the block and member.

8. Sizing mechanism as in claim 1 characterized in that the horizontal knives include an upper knife supported by a fixedly-positioned block carried by opposite sides of the framework, a lower knife carried by a member extending between opposite sides of the framework and adjustable relative to the upper knife, said knives each having a transfer bar carried by the supporting structure for the knife and active to support the knife against pressure on its cutting edge, said knives being spaced apart a distance equal to the width of the veneer element, said vertical knives having their cutting edges facing in the same direction as the cutting edges of the upper and lower knives, but with the vertical-knife cutting edges rearwardly disposed relative to a vertical plane which includes the cutting edges of the upper and lower knives, said vertical knives being spaced apart a distance equal to the length dimension of the completed veneer element, each of said transfer bars having a kerf to thereby permit positioning of a portion of the cutting zone of a vertical knife within such kerf with the transfer bars adjustably positionable in correspondence with vertical knife adjustment.

9. Sizing mechanism as in claim 1 characterized in that the horizontal knives include upper and lower knives having their cutting edges facing the blank-advancing mechanism and relatively spaced to provide the side edges of the veneer blank, said upper knife being supported relative to the under face of a block fixedly secured to the sides of the framework, said knife and block being separated by a removable shim substantially equal to the length of the knife and tapered from end to end to thereby locate the cutting edge of the knife as angular to the under surface of the block, said knife and shim being secured to and supported from the under side of the block to thereby render the sizing mechanism active to cut the side edges of veneer elements of the "hamper stave" type.

10. Sizing mechanism as in claim 1 characterized in that the blank-advancing mechanism includes a cross head mounted relative to the sides of the framework to provide a single-plane reciprocating movement between the forward end of the machine and the cutting mechanism, power means, and operating connections between the power means and such head operative to produce a speed cycle during a stroke of the head in which the opposite end zones of the stroke are of decreased speed value as compared to the central zone of the stroke.

11. Sizing mechanism as in claim 1 characterized in that the blank-advancing mechanism includes a head mounted for single-plane reciprocation between the front of the machine and the cutting mechanism, said head carrying a renewable face conformation formed of relatively soft metal.

12. Sizing mechanism as in claim 1 characterized in that the blank-advancing mechanism includes a head mounted relative to the framework for single-plane reciprocating movement between the forward end of the framework and the cutting mechanism, said head having a facial zone formed with recesses extending inwardly from the ends of the head and cooperative with the laterally movable means to permit positioning of said means in rear of advanced blanks prior to the return stroke of the head to thereby maintain the advanced blanks in their advanced positions.

13. Sizing mechanism as in claim 1 characterized in that the laterally movable means includes a pair of oppositely-positioned fingers movable in the general direction of their length into and out of the path of travel of the advancing blanks to thereby permit blank advance to the cutting zone and to extend into the path of the blanks after the blanks have reached the cutting zone.

14. Sizing mechanism as in claim 1 characterized in that the laterally movable means includes a pair of oppositely-positioned fingers movable in the general direction of their length into and out of the path of travel of the advancing blanks to thereby permit blank advance to the cutting zone and to extend into the path of the blanks after the blanks have reached the cutting zone, one of said fingers being adjustable as to position to thereby compensate for blanks varying as to length.

15. Sizing mechanism as in claim 1 characterized in that the laterally movable means includes a pair of oppositely-positioned fingers movable in the general direction of their length into and out of the path of travel of the advancing blanks to thereby permit blank advance to the cutting zone and to extend into the path of the blanks after the blanks have reached the cutting zone, the said fingers being movable within their stroke lengths by hydraulic means controlled as to activity in timed relation with the movements of the blank-advancing mechanism.

16. Sizing mechanism as in claim 1 characterized in that the laterally movable means includes a pair of oppositely-positioned fingers movable in the general direction of their length into and out of the path of travel of the advancing blanks to thereby permit blank advance to the cutting zone and to extend into the path of the blanks after the blanks have reached the cutting zone, said fingers being movable to their inactive positions by hydraulically-operated pivotally-mounted elements individual to the fingers with the hydraulic activities provided by a common source, the movement of the fingers in the opposite direction being by spring activity, the hydraulic source having its activities controlled in timed relation with the blank-advancing mechanism.

17. Sizing mechanism as in claim 1 characterized in that the laterally movable means includes a pair of oppositely-positioned fingers movable in the general direction of their length into and out of the path of travel of the advancing blanks to thereby permit blank advance to the cutting zone and to extend into the path of the blanks after the blanks have reached the cutting zone, said fingers being movable to their inactive positions by hydraulically-operated pivotally-mounted elements individual to the fingers with the hydraulic activities provided by a common source, the movement of the fingers in the opposite direction being by spring activity, the hydraulic source having its activities controlled in timed relation with the blank-advancing mechanism, the control mechanism including a rotatable cam and an oscillable member rendered active by cam movements and operative to produce hydraulic activities.

18. Sizing mechanism as in claim 1 characterized in that said horizontal knives and vertical knives are positioned to produce a throat into which blanks are introduced by the advance of the blank-advancing mechanism with the advancing blanks supported on their lower side edges prior to entrance into the throat, and supporting means for the completed veneer elements emerging from said throat, said means extending beyond the rear end of the machine and adapted to retain the veneer elements in such edge-supported status.

19. Sizing mechanism as in claim 1 characterized in that said horizontal knives and vertical knives are positioned to produce a throat into which blanks are introduced by the advance of the blank-advancing mechanism with the advancing blanks supported on their lower side edges prior to entrance into the throat, and supporting means for the completed veneer elements emerging from said throat, said means extending beyond the rear end of the machine and adapted to retain the veneer elements in such edge-supported status, said means including a rear zone inclined upwardly to thereby cause the advancing blanks to retain their facial contact, whereby movement of the treated material whether in blank or in completed element form will be in an advancing direction with adjacent members in facial contact during the advancing movements.

20. Sizing mechanism as in claim 1 characterized in that the horizontal knives include an upper knife supported by a fixedly-positioned block carried by opposite sides of the framework, a lower knife carried by a member extending between opposite sides of the framework and adjustable relative to the upper knife, said knives each having a transfer bar carried by the supporting structure for the knife and active to support the knife against pressure on its cutting edge, said knives being spaced apart a distance equal to the width of the veneer element, said vertical knives having their cutting edges facing in the same direction as the cutting edges of the upper and lower knives, but with the vertical-knife cutting edges rearwardly disposed relative to a vertical plane which includes the cutting edges of the upper and lower knives, said vertical knives being spaced apart a distance equal to the length dimension of the completed veneer element, said vertical knives each being supported by holders positioned on rear of the block and member, each holder having a conformation including a portion extending forwardly in service and having a forward beveled face and a vertical slot in rear and spaced from such face, the vertical knife carried by the holder being recessed inwardly from its rear edge, said recess and slot being adapted to permit mounting of the knife on the holder by removable securing means, with the knife adjustable both vertically and horizontally.

EMORY LOYD DELL, Jr.
THOMAS MARION STRICKLAND.

References Cited in the file of this patent

UNITED STATES PATENTS

| Number | Name | Date |
|---|---|---|
| 304,724 | Graff | Sept. 9, 1884 |
| 314,384 | Klose | Mar. 24, 1885 |
| 395,526 | Totman | Jan. 1, 1889 |
| 745,260 | Stuart | Nov. 24, 1903 |
| 768,582 | Calkins | Aug. 30, 1904 |
| 1,226,185 | Carlin | May 15, 1917 |
| 1,454,399 | Norris | May 8, 1923 |
| 1,649,373 | Trevor et al. | Nov. 15, 1927 |
| 2,418,570 | Bernard | Apr. 8, 1947 |